United States Patent [19]

Monte

[11] 4,105,824

[45] Aug. 8, 1978

[54] STARCH-DEXTRINE-POLYACRYLAMIDE ADHESIVE AND TAPE

[75] Inventor: Robert W. Monte, South Merrimack, N.H.

[73] Assignee: Nashua Corporation, Nashua, N.H.

[21] Appl. No.: 784,460

[22] Filed: Apr. 4, 1977

Related U.S. Application Data

[63] Continuation-in-part of Ser. No. 607,680, Aug. 25, 1975, abandoned.

[51] Int. Cl.$^2$ .............................. C09J 7/04; C08L 3/12
[52] U.S. Cl. .............................. 428/355; 260/17.4 ST; 428/476; 428/535
[58] Field of Search ............... 260/17.4 ST; 428/355, 428/476, 343, 533, 535

[56] References Cited

U.S. PATENT DOCUMENTS

| | | | |
|---|---|---|---|
| 2,791,512 | 5/1957 | Hatch et al. ........................... | 106/210 |
| 2,808,381 | 10/1957 | Stone ..................................... | 260/17.4 |
| 2,976,178 | 3/1961 | Pahl et al. ............................. | 428/350 |
| 2,997,404 | 8/1961 | Roberson ............................... | 106/208 |
| 3,282,870 | 11/1966 | Harmer ................................. | 260/17.4 |
| 3,684,749 | 8/1972 | Arai et al. ............................. | 260/17.4 |
| 3,696,065 | 10/1972 | Hoffman ............................... | 260/17.4 |
| 3,728,141 | 4/1973 | Ray-Chaudhuri .................... | 260/17.4 |
| 3,793,269 | 2/1974 | Bruschtein ............................ | 260/17 |
| 3,950,593 | 4/1976 | Bomball et al. ...................... | 428/476 |
| 3,988,495 | 10/1976 | Lowey et al. ......................... | 428/343 |

OTHER PUBLICATIONS

"Dow" Resin 164, Binder and Adhesive for Drywall Construction, The Dow Chem. Co., Midland, Mich., pp. 4 & 7.

*Primary Examiner*—Edward M. Woodberry
*Attorney, Agent, or Firm*—Kenway & Jenney

[57] ABSTRACT

Adhesive composition comprising starch, dextrine and a polyacrylamide. The composition is carried by water; but, when the composition is applied to a substrate, the water is evaporated to produce a water activatable adhesive. Thus, the composition is suitable for application to a paper backing to form an adhesive tape.

Method of preparing the adhesive from a dry polyacrylamide starting material includes the steps of first dissolving the dextrine and dry polyacrylamide in water and allowing the dextrine and polyacrylamide to mix. The starch is then added to that mixture. Preferably, the dextrine and polyacrylamide are mixed for at least a half-hour before the starch is added. To prevent the particles of dextrine and polyacrylamide from agglomerating together, it has been found advantageous to mix the dextrine and polyacrylamide in small batches. This step, however, is not critical.

It is also possible to utilize an aqueous solution containing dissolved polyacrylamide, (liquid polyacrylamide) as a starting material. In this embodiment, the dextrine, liquid polyacrylamide and starch are added to water in any order to form the adhesive mixture.

18 Claims, 1 Drawing Figure

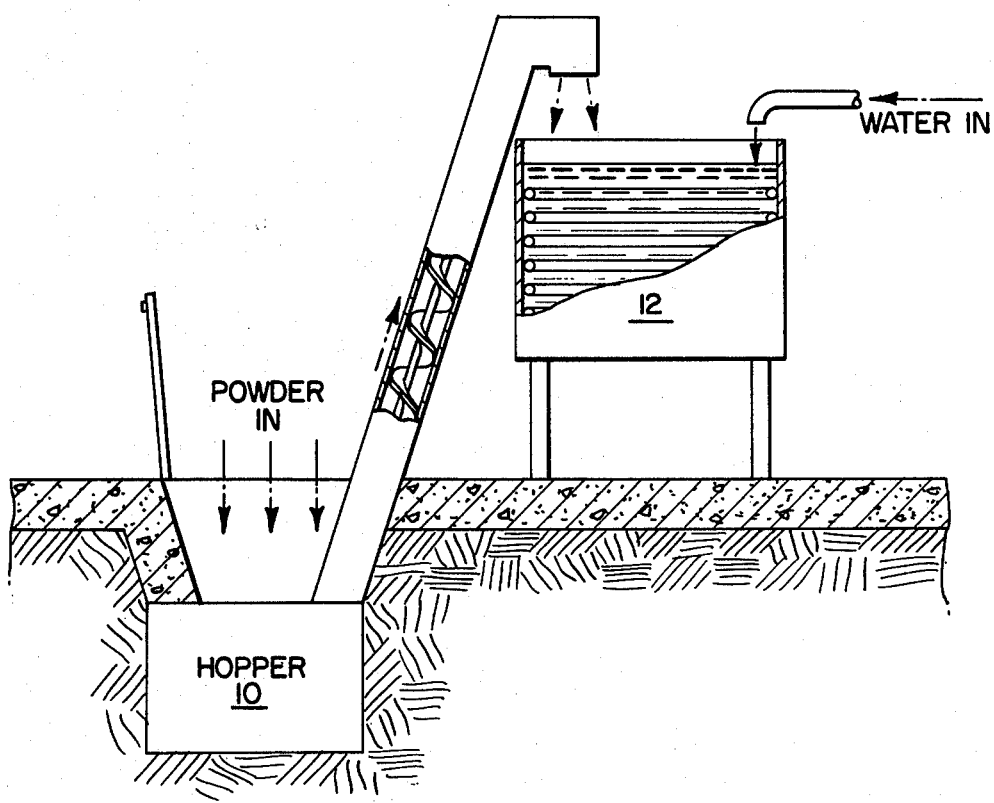

STARCH-DEXTRINE-POLYACRYLAMIDE ADHESIVE AND TAPE

CROSS REFERENCE TO A RELATED APPLICATION

This application is a continuation-in-part of copending patent application Ser. No. 607,680 (now abandoned), entitled STARCH-DEXTRINE-POLYACRYLAMIDE ADHESIVE AND TAPE filed on AUG. 25, 1975, the teachings of which are incorporated herein by reference.

BACKGROUND OF THE INVENTION

This invention relates to a water activated adhesive composition and to an adhesive tape employing the composition.

Adhesive compositions have been employed as a coating on thin paper strips to form paper-backed adhesives employed to join the ends of paper board forms, particularly boxes. Animal glue-based adhesives have been widely used as the adhesive for such tapes.

To obtain satisfactory adhesion with water activated tapes, it is necessary that the water activated tape have the correct tack and setting characteristics. For example, it must rapidly gain tack when water activated (initial adhesion), and retain this tack for a reasonable period of time (open time) so that minor delays in applying it to a carton do not cause sealing tape failure on the resulting package. When water activated and applied to the meeting edges of folded flaps of a cardboard carton, the tape should adhere tenaciously, even prior to drying and hold the folded flaps in position against the shear forces exerted against the seal by the tendency of the folded flaps to open to their original unfolded condition (wet shear strength). After being placed in position over the flaps of a carton, and allowed to dry, the tape should form seals of high adhesive and shear strength and thus continue to effectively perform its sealing function.

In addition to the foregoing, under ordinarily encountered conditions of temperature and humidity, the gummed sealing tape should not block when shipped or stored in roll form, or as sheets stacked one on top of another, even though in such structures the water-activatable gummed layer of one sheet is in direct contact with the backing of an adjacent sheet.

Furthermore, such tapes must possess proper strength characteristics in order to be employed in present machine-automated packaging systems. In such systems, the tape is rolled from a cylindrical roll, passed over a water applicator such as a brush and then to the surface of the paper board at the desired location. If the adhesive is too tacky, it will not unroll from the paper roll at the satisfactory rate since it will stick to the adjacent paper undesirably. Furthermore, if the adhesive does not have the correct degree of tack and setting, it will become loosened within a relatively short time after application to the paper board.

Up to the present time, no synthetic-based adhesive has been found satisfactory for use as a water activated adhesive so that, up to the present time, animal glue-based adhesives have been employed uniformly. However, animal glues recently have become unsatisfactory due to a greatly increased cost. This increased cost has provided an incentive to form alternative adhesive systems.

SUMMARY OF THE INVENTION

The present invention is directed to a synthetic water activated adhesive which can be utilized in conjunction with paper sheets to form a water activated tape. The synthetic adhesive of the present invention can be utilized to replace animal glue-based adhesives. The adhesive of the present composition includes water, starch, dextrine and a polyacrylamide.

When utilizing dry polyacrylamide as the source of the polyacrylamide component, an important aspect of the invention is the manner in which the adhesive is prepared. In this situation, the adhesive is prepared by mixing the dextrine and polyacrylamide together under conditions which prevent agglomeration. After the dextrine and resin are sufficiently mixed, the starch is added.

Accordingly, an object of the present invention is to provide a synthetic adhesive which can be utilized in wateractivated tapes and which when activated and applied to paper board forms a quick setting, strong bonding tape which equals or exceeds the strength characteristic of presently known tapes which utilize animal-base adhesive compositions.

A further object of the present invention is to provide a synthetic comosition which includes water, starch, dextrine and a polyacrylamide.

Another object of the present invention is to provide a method for preparing a synthetic adhesive which includes starch, dextrine and polyacrylamide in a water carrier.

BRIEF DESCRIPTION OF THE DRAWING

The sole FIGURE of the drawing is a diagram illustrating the procedure for preparing the adhesive composition of the present invention when employing dry polyacrylamide as a starting material.

DESCRIPTION OF THE PREFERRED EMBODIMENTS

At the outset, the present invention is described in its broadest overall aspects with a more detailed description following. Basically, the adhesive for application on the tape comprises a composition which is formulated in water and which includes starch, dextrine, and a polyacrylamide. The adhesive composition can be applied to one surface of a paper backing to form an adhesive tape suitable to be wound as a roll without premature bonding and without loss of adhesive strength. The manner of combining the components is critical since it influences the adhesive's properties. The composition is coated onto a substrate and split into suitable widths for use in carton sealing or in box tapes.

The starches which are useable in the adhesive in the present invention must be a waxy-maize variety cornstarch of low viscosity.

The weight percentages given herein for starch are based upon the weight of the amylopectin in the starch of this invention. The amylopectin provides cohesive strength to the overall adhesive composition as well as providing tackiness thereof. It is desirable to employ a corn starch having as high a concentration of amylopectin and as low a concentration of amylose as possible in order to maintain high adhesion of the composition. A preferred starch which can be employed in the adhesive of the present invention is sold by American Maize Corporation under the trade name Amaizo 839 which is grown from a hybrid corn and contains more than about 95 weight percent amylopectin. This and other starches employed in the adhesive of the present invention are medium molecular weight starches with a molecular weight within the range of between about 20,000 and about 50,000.

The terms, "a low viscosity starch" as used in this specification and claims is meant to include a starch which when dissolved in sufficient water to produce a mixture having a 45% solid content will result in a solution with a viscosity of 1200–1600 centipoises at 160° F as measured by a Brookfield viscometer, No. 3 spindle at 30 rpms.

The starch functions to increase initial tack of the overall adhesive composition when the adhesive composition is remoistened just prior to use. The medium molecular weight low viscosity starch is employed in amounts such that the final dry adhesive coating will have a starch content of between about 55 and about 75 percent dry weight, preferably between 60 and about 70 percent dry weight. When the concentration of the medium molecular weight starch is too high, the cohesive strength of the overall adhesive composition is undesirably reduced. When the concentration of the medium molecular weight starch is too low, the tack of the overall adhesive composition is too low to provide desirable quick adhesion.

Other starches which have been found useful in the present adhesive include the following:
Tapon 82 — National Starch
Tapon +6 —0 National Starch
Sta-tape 100 — A.E. Staley Co.

The dextrines which are useable in the present invention must have a cold water solubility of at least 90%. (77° F). A canary or yellow corn dextrine is preferred. Typical dextrines of this high solubility class are prepared by the acid torrefication of ordinary corn starch, tapioca starch, etc. To ascertain whether or not a dextrine can be classified as one that is at least 90% or more soluble at 77° C, the following tests can be performed.

Mix 25 grams of dry dextrine material with 250 ml of water at 77° F. Shake the mixture periodically until equilibrium between the dissolved and undissolved portion is reached, and then add an additional 250 ml of water at 77° F to bring the total water to 500 ml. The resulting mixture can be shaken and tested at intervals until constant values are obtained, the test being as follows:

After allowing a period of time for undissolved dextrine to settle out of the mixture, 50 ml aliquot portion of the supernatant liquid is withdrawn and its water evaporated to determine the weight of dextrine dissolved therein. Calculations are then made to determine the percent of solubility exhibited by the dextrine.

Dextrines which have been found particularly suitable in practicing the present invention include the following:
1. Stadax 128 — A.E. Staley Co.
2. Nadex 771 — National Starch
3. Amaize 1752 Dextrine — American Maize Co.
4. Canary S8032 — Corn Products Co.

The dextrine functions to regulate the open time of the adhesive composition. By open time is meant the amount of time after the adhesive is moistened that it remains tacky. Too much dextrine will cut down on the initial tack and too little dextrine will cut down on the open time.

The dextrine is employed in amounts such that the final dry adhesive coating will have a dextrine content between about 15 and 40 percent dry weight, preferably between 25 and 35 percent, dry weight.

As has been stated above, the adhesive of the present invention includes an acrylamide. Polymers and copolymers of acrylamides have been previously suggested as water-soluble adhesives. For example, see U.S. Pat. Nos. 2,616,818, 2,953,546, and 2,976,262.

Precise measurements of the actual molecular weight of water soluble polymers such as polyacrylamide are difficult and tedious to obtain. In general, in this art, the viscosity of solutions of the polymer under carefully defined conditions have been employed as an index correlated with the molecular weight. The polyacrylamides employed in the adhesive compositions of the present invention are characterized by a viscosity of at least 2.4 centipoises for a 0.5 percent by weight solution of the polymer in distilled water adjusted to a pH of 3 as determined with an Ostwald viscosimeter at a temperature of 25° C. The viscosity so determined will be referred to in the present specification and claims as the "Oswald viscosity". In addition to the above lower limit on Oswald viscosity, the polymers must have a viscosity of no greater than 700 centipoises and preferably no greater than 600 centipoises for an aqueous 5.1 percent by weight solution of the polymer in 1 percent borax solution at a pH of 9.2 as determined with a Brookfield viscosimeter at 25° C using the No. 3 spindle operating at 50 revolutions per minute. The latter viscosity determined under the specified conditions is referred to herein as the "Brookfield viscosity." Preferably, the polyacrylamide has an Oswald viscosity as defined above in the range of from 2.45 to 2.7 centipoises and all such polyacrylamides have a low degree of hydrolysis whereby only about 5 percent or less of the original carboxamide groups in the polymer have been hydrolyzed to carboxylic acid groups. The foregoing limits on the Oswald viscosity and the Brookfield viscosity are critical for obtaining the desired improvement in adhesion without producing final tape compositions which become so viscous as to be unworkable at practical water contents.

Suitable polyacrylamides, having the desired low degree of hydrolysis and the proper range of molecular weight as evidenced by the viscosity of the product, may be prepared by polymerizing aqueous acrylamide monomer under controlled conditions of temperature, pH and catalyst concentration. A polyacrylamide having the desired properties may be prepared in the following manner. A 20 to 25 percent by weight solution of acrylamide monomer containing from about 40 to 100 p.p.m. of cupric ion in deionized water is adjusted to a pH of 5.7 to 7.2 and a temperature of about 25° C and sparged with nitrogen for 10 minutes to purge the solution of inhibitory oxygen. On completion of the purging, a 10 percent solution of the pentasodium salt of (carboxymethylimino) bis(ethylenenitrilo) tetraacetic acid (Versenex 80) is added in amount to provide from about 300 to 600 parts of the Versenex 80 compound per million parts of monomer, depending upon the initial copper content. Thereafter, while stirring vigorously, separate streams of aqueous 10 percent solution of sodium persulfate and aqueous 10 solution of sodium bisulfite are added in amount to provide about 500 to 800 parts of the persulfate and about 500 to 1100 parts of the bisulfite per million parts of monomer to act as polymerization catalyst. Reaction is initiated by addition of the catalyst and the temperature of the reaction mixture rises to about 75° – 88° C in a period of from about 2 to 12 minutes. The reaction mixture is maintained at 60° – 80° C for about 30 additional minutes to complete the polymerization and the product is dried in any suitable fashion as, for example, on a double drum drier. Conventional additives such as a sodium acetate buffer can be employed and if the polymer is to be dried on a drum drier, it is convenient to add a roll release agent such as a long chain alkyl phenoxybenzene sulfonate. For purposes of the present invention, the dried polymer is finely ground as, for example, in a high-speed hammer mill and sieved to obtain a product of which substantially 100 percent passes a screen having 40 meshes to the inch. A suitable dry polyacrylamide for use in the composition of the present invention is sold by the Dow Chemical Company under their description "Dow" Resin 164.

As mentioned above, the adhesive can also be prepared by utilizing liquid polyacrylamide as a starting material. Socalled liquid polyacrylamide is available from Dow Chemical Company under the description XD8979.00L. This liquid polyacrylamide contains polyacrylamide of the type described above but which is dissolved in water. Dow SC8978.00L contains 17% by weight polyacrylamide.

An important aspect of the present invention is the selection of the polyacrylamide. The function of the polyacrylamide is to develop tack. The polyacrylamide develops both initial tack and open tack. In accordance with the present invention, numerous tests were conducted and it was found that only polyacrylamides having the characteristics set forth above were useable. That is, the polyacrylamide must be characterized as having an "Oswald viscosity" of at least 2.5 centiposes. The polyacrylamide cannot have a "Brookfield viscosity" greater than 700 centiposes. Preferably the polyacrylamide will not have a "Brookfield viscosity" greater than 600 centiposes. It is also important that the polyacrylamide have a low degree of hydrolysis whereby only 5% or less of the original carboxamide group in the polymer had been hydrolized to the carboxylic acid group.

The polyacrylamide is employed in amounts such that the final dry adhesive will have a polyacrylamide content between about 3 and about 5 percent dry weight.

When the concentration of the polyacrylamide is too high, viscosity problems result such that a continuous coating of the adhesive cannot be performed. When too little polyacrylamide is used, the resulting tape will not be capable of developing tack.

The composition of the present invention may also include a dispersing agent. The purpose of the dispersing agent is to dissolve the polyacrylamide resin. In connection with this point, it should be noted that the dry polyacrylamide resin used in the present invention dissolves very slowly. DAXAD 11 from W.R. Grace Chemical Company, Cambridge, Mass. has been employed to great advantage in the process of the present invention. It should be noted, however, that any dispersing agent that will disperse the polyacrylamide to allow the dry polyacrylamide to dissolve quickly in water is useable in the present invention. It should also be noted that it is even possible to produce the adhesive without the dispersing agent; however, the use of a dispersing agent increases the efficiency at which the adhesive can be manufactured commercially. An amount of dispersing agent is used such that the amount of dispersing agent in the final adhesive is about 0.76% dry weight Daxad 11 consists of polymerized sodium salts of alkyl, aryl, and aryl alkyl sulfonic acids.

Of course, when liquid polyacrylamide is utilized as the polyacrylamide source, it is not necessary to add a separate disperser since the polyacrylamide in the liquid has already been dissolved by the manufacturer. Thus, dissolving the polyacrylamide is not a problem for subsequent users.

The composition of the dry adhesive of the present invention is set forth in Table I below. The term "dry" is intended to describe the adhesive as it appears on a coated substrate.

TABLE I

| Ingredients | Useable | Percent by Weight Range Preferred |
|---|---|---|
| Water | 5–12 | 6–10 |
| Starch | 55–75 | 60–70 |
| Dextrine | 15–40 | 25–35 |
| Polyacrylamide | 2–6 | 3–5 |
| Dispersing Agent | 0–10 | .5–.8 |

A procedure for preparing an adhesive having a composition within the range set forth in Table I above follows:

1. Raw Material

| Ingredients | Supplier | Pounds | Gallons |
|---|---|---|---|
| Water | | | 550 |
| Daxad TT | W.R. Grace | 50 | |
| Foamaster B | Nopco Chemical | (2 cap fulls) | |
| Dow 164 | Dow | 225 | |
| Canary dextrine | C.P.C. | 1900 | |
| Amaiza 839 | American Maize | 4400 | |

MIXING PROCEDURE

1. Add 2 bags (200 lbs.) Canary dextrine and 1 bag (50 lbs.) of Dow 164 resin to hopper 10.
2. Add 2 more bags Canary dextrine (200 lbs.) and another bag (50 lbs) of Dow 164 resin to hopper 10.
3. Repeat this procedure until a total of 4 bags (200 lbs.) of Dow 164 resin and 800 lbs. of dextrine are in hopper 10.
4. Add the remaining 25 lbs. of Dow 164 resin and the remaining Canary dextrine to hopper 10. Stop — no more material should be added to the hopper 10 at this point.
5. Fill mixing tank 12, separated from the hopper, with 550 gallons of water.
6. Heat the water in the mixing tank 12 to 100° – 120° F and add 50 lbs. Daxad 11 to the warm water.
7. Mix the water and Daxad 11 for 5 minutes and add 2 capfuls (30 ml) of Foamster B to prevent foaming. This ingredient is optional but desirable if foaming occurs. Of course, any anti-foaming agent can be used.
8. With agitating the mixer 12, add the Dow 164 and Canary dextrine from the hopper 10 to the mix tank 12, mix for 30 minutes. Do not heat.
9. While the Dow resin and Canary dextrine are mixing, add Amaizo 839 to the hopper 10.
10. After 30 minutes mixing, check bath for lumps.
11. If batch is smooth and lump free, add Amaizo 839 from hopper 10 to the mixing tank 12.
12. Mix until uniform and heat to 200° F for 30 minutes.
13. Sample for viscosity and percent solids.

When utilizing liquid polyacrylamide, mixing order is not critical. An acceptable procedure is as follows:

1. Fill mixing tank 12, separated from the hopper, with 550 gallons of water.
2. Heat the water in the mixing tank 12 to 100° – 120° F.
3. Add 1900 lbs. of dextrine and mix for ten minutes.
4. Add 4400 lbs. of starch and mix for ten minutes.
5. Add 1324 lbs. of Dow XD8978.00L containing 17% solids.
6. Mix until uniform and heat to 200° F for 30 minutes.
7. Sample for viscosity and percent solids.

V. STORAGE

1. After completion of mixing, glue should be held in a storage tank with agitator set on slow.
2. Temperature in storage tank should not be allowed to drop below 120° F at any time. Steam should be applied if temperature drops to 120° F.

A water activated tape can be prepared as follows:

The adhesive composition is applied to a fiberglass reinforced Kraft paper backing by being passed in the NIP formed by a coating roll and two smaller nip rolls in a "kissroll" system. During application, the adhesive composition is maintained at about 160° – 170° F. After being coated, the paper is passed through an oven maintained at a temperature between 300° and 500° F to reduce the tackiness of the adhesive and to drive off all but about 10% or less of the water. A suitable coating weight is between 17 and 20 pounds per ream of paper. The adhesive-coated paper is then wound on a disperser roll. The most important part of the procedure is that the resin and dextrine be allowed to mix by themselves before adding the starch. Numerous tests have indicated that when utilizing dry polyacrylamide if the starch is added to the composition along with or prior to intimate mixing of the dextrine and resin, that tackiness of the final adhesive is inferior and the viscosity is high.

The coated paper was found to have a McLaurin Value of 90 to 100. The coated paper was tested in a Fipago Testor, by moistening the paper, allowing an open setting time of 1 ½ seconds and a closed setting time of 1 second. A typical value for the coated paper in the Fipago Testor was 57. In a quickgrab test, the paper was moistened and applied to a corrugated carton. A closed setting time of only 6 – 10 seconds was needed to produce a fiber tearing bond.

The invention may be embodied in other specific forms without departing from the spirit or essential characteristics thereof. The present embodiments are therefore to be considered in all respect as illustrative and not restrictive, the scope of the invention being indicated by the appended claims rather than by the foregoing description, and all changes which come within the meaning and range of equivalency of the claims are therefore intended to be embraced therein.

I claim:

1. A water activatable adhesive comprising water, starch, dextrine and a polyacrylamide, said starch being a waxy-maze variety of corn starch and containing 95 weight percent amylopectin and having a molecular weight between the range of 20,000 and 50,000 and having a low viscosity such that when dissolved in sufficient water to produce a mixture having a 45% solid content will result in a solution with a viscosity of 12,000 to 16,000 centiposes at 160° F as measured by a Brookfield viscosity, No. 3 spindle at 30 rpm and being present in an amount such that final dry adhesive will have an amylopectin content between 55 and 75% dry weight, said dextrine having a cold water solubility of at least 90% (77° F) and being employed in amounts such that a final dry adhesive will have a dextrine content between about 15 and 40% dry weight, said polyacrylamide having an "Oswald viscosity" of at least 2.5 centiposes and a "Brookfield viscosity" no greater than 700 centiposes, said polyacrylamide also having a low degree of hydrolysis in that only 5% or less of the original carboxamide group in the polyacrylamide has been hydrolysized to the carboxylic group, said polyacrylamide being employed in amounts such that the final dry adhesive will have a polyacrylamide content between about 2 and about 6% dry weight.

2. The adhesive as set forth in claim 1 wherein said adhesive includes a dispersing agent in amounts sufficient to allow the polyacrylamide to dissolve more rapidly in water.

3. The adhesive as set forth in claim 1 wherein said dextrine is a dextrine selected from the group of canary corn dextrine and yellow corn dextrine.

4. The adhesive as set forth in claim 3 wherein said dextrine is prepared by the acid torrefication of starch.

5. The adhesive as set forth in claim 4 wherein said polyacrylamide has a Brookfield viscosity no greater than 600 centiposes.

6. The adhesive as set forth in claim 1 wherein said polyacrylamide has an Oswald viscosity between the range of 2.45 to 2.7 centiposes.

7. The adhesive as set forth in claim 1 wherein said adhesive has the following composition:

| Ingredients | Percent by Dry Weight |
| --- | --- |
| Water | 6–10 |
| Starch | 60–70 |
| Dextrine | 25–35 |
| Polyacrylamide | 3–5 |
| Dispersing Agent | .5–.8 |

8. A water activatable adhesive tape suitable to be wound as a roll without premature bonding and without loss of adhesive strength which comprises a paper backing having coated on one surface thereof an adhesive composition comprising:

water, starch, dextrine and a polyacylamide, said starch being a waxy-maze variety of corn starch and containing 95 weight percent amylopectin and having a molecular weight between the range of 20,000 and 50,000 and having a low viscosity such that when dissolved in sufficient water to produce a mixture having a 45% solid content will result in a solution with a viscosity of 12,000 to 16,000 centiposes at 160° F as measured by a Brookfield viscosity, No. 3 spindle at 30 rpm and being present in an amount such that the final dry adhesive will have an amylopectin content between 55 and 75% dry weight, said dextrine having a cold water solubility of at least 90% (77° F) and being employed in amounts such that a final dry adhesive will have a dextrine content between about 15 and 40% dry weight, said polyacrylamide having an "Oswald viscosity" of at least 2.5 centiposes and a "Brookfield viscosity" no greater than 700 Centiposes, said polyacrylamide also having a low degree of hydrolysis in that only 5% or less of the original carboxamide group in the polyacrylamide has been hydrolysized to the carboxylic group, said polyacrylamide being employed in amounts such that the final dry adhesive will have a polyacrylamide content between about 2 and about 6% dry weight.

9. The tape as set forth in claim 8 wherein said adhesive includes a dispersing agent in amounts sufficient to allow the polyacrylamide to dissolve more rapidly in water.

10. The tape as set forth in claim 8 wherein said dextrine is a dextrine selected from the group of canary corn dextrine and yellow corn dextrine.

11. The tape as set forth in claim 10 wherein said dextrine is prepared by the acid torrefication of starch.

12. The tape as set forth in claim 11 wherein said polyacrylamide has a Brookfield viscosity no greater than 600 centiposes.

13. The tape as set forth in claim 8 wherein said polyacrylamide has an Oswald viscosity between the range of 2.45 to 2.7 centiposes.

14. The tape as set forth in claim 8 wherein said adhesive has the following composition:

| Ingredients | Percent by Weight |
| --- | --- |
| Water | 6–10 |
| Starch | 60–70 |
| Dextrine | 25–35 |
| Polyacrylamide | 3–5 |
| Dispersing Agent | .5–.8 |

15. A method of preparing a water activatable adhesive which includes water, starch, dextrine and a polyacrylamide comprising the steps of:
 (a) first dissolving the dextrin and polyacrylamide in water;
 (b) allowing the dextrine and polyacrylamide to mix;
 (c) thereafter adding starch to the mixture of step (b) and,
 (d) evaporating a portion of the water to produce a water activatable adhesive containing 10% or less water.

16. The method as set forth in claim 15 wherein the dextrine and polyacrylamide are mixed at least ½ hour before the starch is added.

17. The method as set forth in claim 15 wherein step (a), the dextrine and polyacrylamide are mixed in batches small enough to present the dextrine and polyacrylamide from agglomerating together.

18. The method as set forth in claim 15 wherein a dispersing agent is added to step (a) to make the polyacrylamide more readily dissolvable.

* * * * *

UNITED STATES PATENT AND TRADEMARK OFFICE
CERTIFICATE OF CORRECTION

PATENT NO. : 4,105,824
DATED : August 8, 1978
INVENTOR(S) : Robert W. Monte

It is certified that error appears in the above-identified patent and that said Letters Patent are hereby corrected as shown below:

Column 2, line 26, change "comosition" to --composition--

Column 3, line 30, change "0 National Starch" to --National Starch--

Column 6, line 29, change "Daxad TT" to --Daxad II--

Column 7, line 50, change "respect" to --respects--

Signed and Sealed this

Sixth Day of February 1979

[SEAL]

Attest:

RUTH C. MASON
*Attesting Officer*

DONALD W. BANNER
*Commissioner of Patents and Trademarks*